United States Patent Office 3,799,832
Patented Mar. 26, 1974

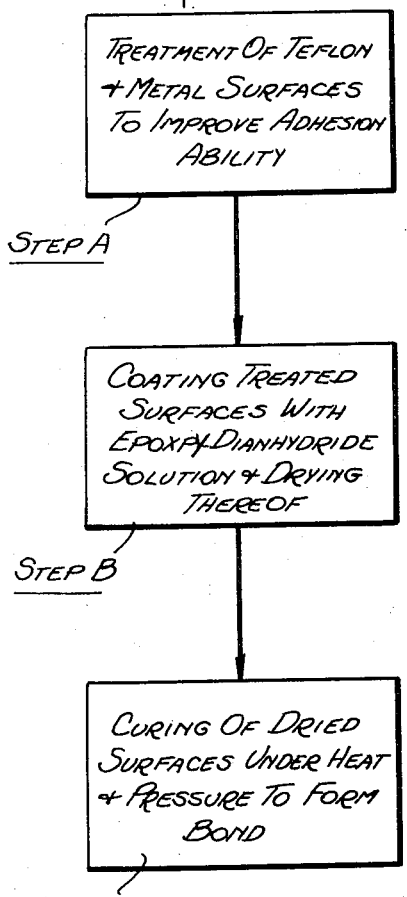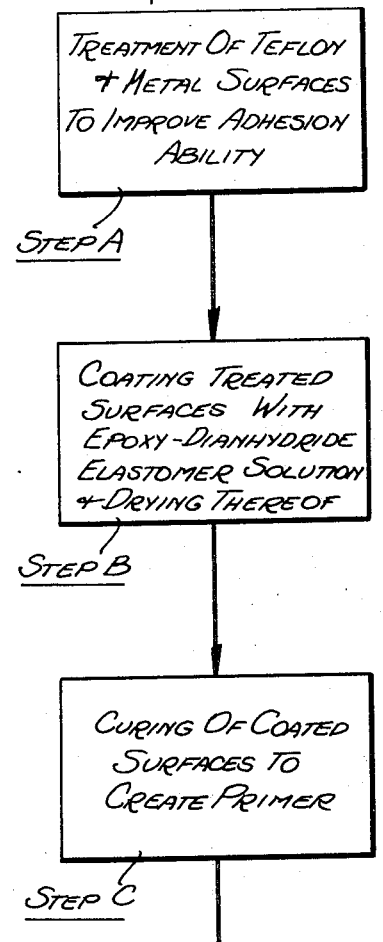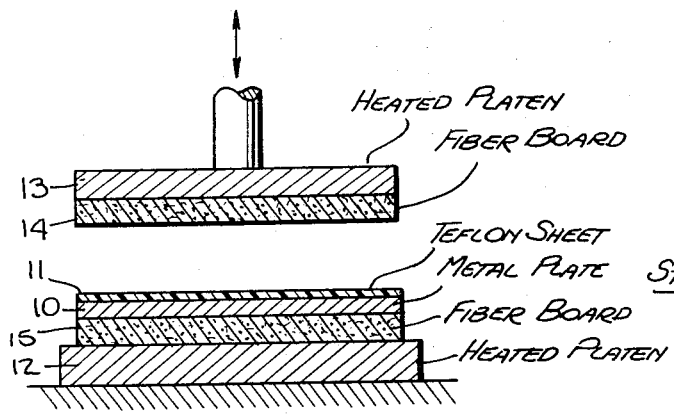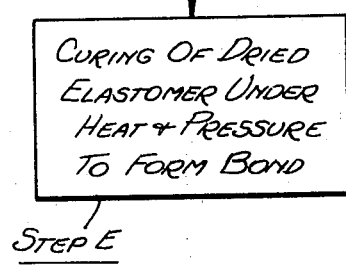

3,799,832
TECHNIQUE FOR BONDING TETRAFLUORO-ETHYLENE SHEET TO METAL SUBSTRATE
Franklin G. Reick, Westwood, N.J., assignor to Michael Ebert, Frederick R. Picut, and Franklin G. Reick, fractional part interest to each
Filed Dec. 6, 1971, Ser. No. 205,203
Int. Cl. B32b 15/08; C09j 5/02
U.S. Cl. 156—330
9 Claims

ABSTRACT OF THE DISCLOSURE

A method of bonding a sheet of tetrafluoroethylene material to a metal plate or substrate, in which the surfaces of the sheet and plate to be joined are first treated to improve their adhesion ability. The treated surfaces are then coated with a solution constituted by an epoxy resin and a dianhydride curing agent in a mixed solvent formed by tetrahydrofuran and dimethylformamide. These surface coatings are dried and then brought together in a heated press to effect curing and bonding thereof. Essentially the same method is used to effect an elastomeric bond of the two materials, but in this instance, the epoxy solution coatings, which further include an elastomer constituent, are first dried and cured to provide a primer, after which they are sprayed with an elastomer solution that is then dried. The primed sheet and plate surface having a dried elastomer layer thereon are then pressed-cured and bonded.

BACKGROUND OF THE INVENTION

This invention relates generally to tetrafluoroethylene resins, and more particularly to an improved technique for bonding a tetrafluoroethylene layer to a metal plate or other substrate.

Tetrafluoroethylene resins, which are members of the fluorocarbon family, have a combination of electrical, chemical, mechanical and thermal properties, unmatched by any other single material. These resins, known commercially under the trademark "Teflon," maintain their useful mechanical properties at temperatures in the range of from —450° F. to 500° F. and higher.

Teflon surfaces manifest an extremely low coefficient of friction and resist adhesion to most materials. Moreover, Teflon is inert to nearly all chemicals and solvents. However, difficulty in bonding to Teflon has significantly reduced its usefulness in some applications, particularly in regard to metal substrates, where existing bonding techniques fail to produce a permanent bond capable of surviving rigorous working conditions.

Various processors have developed their own patented procedures for treating a Teflon surface so that conventional adhesives will bond thereto. In one such procedure, the Teflon surface is exposed to an active sodium solution which removes the barrier of fluoride atoms, leaving a wettable carbonaceous surface.

In this treatment, the Teflon polymeric surface is turned grayish-brown with sodium or other alkali metal in anhydrous liquid ammonia, presumably due to carbon left behind when the sodium ammonia complex has extracted fluorine atoms from the polymer. The treated Teflon surface is then bonded to a substrate by means of a solvent-free reactive cement.

A detailed description of an acceptable treatment technique for preparing the surface of Teflon for bonding, may be found in the Information Bulletin No. X-75, published by Polychemicals Department of E. I. du Pont de Nemours & Co., of Wilmington, Del.

There are particular advantages gained in cladding metal products with a Teflon layer, for then one combines the well-known non-stick, chemical-inert, high-temperature resistance and other unusual properties of Teflon, with the strength and rigidity of metal. Thus, in food-processing machinery, the use of Teflon coating is highly desirable, for it affords a release coating for cookers, mixers, storage vessels, packaging machines, and other devices which come in contact with the food being processed. Teflon coatings are also useful in textile equipment, as well as for industrial components of various types as a dry lubricant.

The difficulty with prior techniques for bonding Teflon to metal substrates is that the resultant bonds in many instances lack sufficient strength, nor are they heat-resistant and immune to chemical attack. Hence failures are encountered under harsh operating conditions, and delamination is experienced. Moreover, prior bonding techniques are relatively complicated and slow, and do not lend themselves to high-speed mass production.

While for convenience, the present invention will identify polymers of tetrafluoroethylene as Teflon, it will be understood that it is applicable to all materials of this class, such as those known under other trademarks (i.e., "Halon TFE" and "Tetran TFE").

SUMMARY OF THE INVENTION

In view of the foregoing, it is the main object of this invention to provide an improved technique for bonding Teflon in sheet or any other form to a metal plate or other substrate.

Among the significant advantages of a technique in accordance with the invention, are that the resultant bonds are of exceptionally high strength, they are chemically-inert, and they withstand rigorous thermal and mechanical operating conditions.

Also an object of the invention is to provide an epoxy bonding technique which is relatively simple and may be carried out at high speed, the technique lending itself to high mass-production rates.

Still another object of the invention is to provide a bonding technique for producing an elastomeric rather than a rigid bond between a Teflon sheet and a metal plate, whereby the resultant Teflon layer has a resilient backing.

Briefly stated, these objects are attained in a bonding procedure in which the surfaces of the Teflon sheet and metal plate which are to be joined, are first treated to improve their adhesion ability. The treated surfaces are then coated with a solution constituted by an epoxy resin and a dianhydride curing agent in a mixed solvent formed by tetrahydrofuran and dimethylformamide. These surface coatings are dried and then brought together under heat and pressure to effect curing of the coatings and bonding of the surfaces.

Essentially the same procedure is used to effect an elastomeric bond, but in this instance, the epoxy coatings which include an elastomer component, are first dried and cured to form a primer, after which they are sprayed with an elastomer solution. The elastomer solution is then dried and the surfaces having the dried elastomer on an epoxy primer, are then press-cured and bonded.

OUTLINE OF THE DRAWINGS

For a better understanding of the invention, as well as other objects and further features thereof, reference is made to the following detailed description to be read in conjunction with the accompanying drawing, wherein:

FIG. 1 is a flow chart showing the sequence of steps entailed in carrying out a technique in accordance with the invention, for directly bonding a Teflon sheet to a metal plate;

FIG. 2 is a schematic illustration of a heated press for carrying out the last step in the bonding technique; and FIG. 3 is a flow chart showing a technique in accordance with the invention for effecting an elastomer bond between a Teflon sheet and a metal plate.

DESCRIPTION OF THE INVENTION

In a bonding technique in accordance with the invention, the surface of a Teflon sheet or Teflon in any other form is bonded to the surface of a metal plate or other substrate by means of a basic epoxy resin used in combination with a dianhydride curing agent. The use of polycarboxylic anhydrides to cure epoxy resins is described in U.S. Pat. 2,324,483.

Step A.—The sequence of steps involved in a bonding procedure in accordance with the invention, is shown in FIG. 1. The first step involves the treatment of the surfaces to be joined to improve their adhesion ability. The metal surface should be made free of contaminants, such as oil and grease, and for this purpose, it may be vapor-degreased or otherwise cleaned. To further improve adhesion, the metal surface may be roughened by gritblasting, chemical etching, or other known techniques serving to roughen the surface.

The Teflon surface is etched or otherwise treated so that an epoxy resin will adhere thereto. For this purpose, the procedures described in the above-identified Information Bulletin, may be used, or one may use any other known treatment presently employed by Teflon processors.

Step B.—The treated metal and Teflon surfaces are then thinly coated with an epoxy-dianhydride solution having the following ingredients:

| Material: | Grams |
|---|---|
| Tetrahydrofuran (THF) | 50 |
| Pyromellitic dianhydride (PMDA) | 5 |
| Dimethylformamide (DMF) | 20 |
| Epoxy resin | 10 |

PMDA, which is manufactured and sold by DuPont, is a highly reactive and efficient dianhydride curing agent for epoxy resins, such as the Dow–662 product. Epoxies cured with PMDA are characterized by excellent electrical and mechanical properties, as well as solvent and chemical resistance, and the ability to withstand prolonged exposure at elevated temperatures. Uniform, stable dispersions of PMDA in liquid epoxy resins are easily prepared with good mechanical mixing at room temperature, but warming the resin slightly (to 160° F.) usually facilitates mixing and aids in the elimination of air bubbles.

While PMDA is disclosed as the preferred curing agent, one may also use BTDA, which is a benzoquinone tetracarboxylic dianhydride synthesized from petroleum-derived raw materials. The use of acid anhydrides as epoxy curing agents, is well established. In general, their use produces cured materials having good electrical and chemical characteristics. However, increasing the functionality of the anhydride leads to a greater density of cross-linking. The epoxy-dianhydride combination in accordance with the invention, closely resembles a ladder polymer and hence is very stable even in harsh environments.

The rate of curing of liquid epoxy resins with PMDA is accelerated by adding THF thereto. But I have found that superior results in the physical properties as well as the heat and chemical resistance of the cured resins may be realized by the use of a mixed solvent in which THF is combined by DMF, a chemical in which PMDA is moderately soluble. The mixed solvent system, for reasons which are not fully understood, gives results far better than are obtainable using a single solvent.

In preparing the solution, the PMDA or whatever anhydride is used, is first dissolved in the mixed solvent (THF and DMF), and then the epoxy is added, causing the solution to turn yellow. It is to be noted that the use of a freshly made solution provides the best bonds.

The cleaned metal surface and the treated Teflon surface are then brushed or painted with a thin layer of the epoxy-dianhydride mixed solvent solution, and the layers are then dried. For this purpose, the coated Teflon sheet and metal plate may be placed in a circulating hot air oven at about 125° F., for a period of approximately fifteen minutes. This volatilizes the solvents and also lowers the viscosity of the PMDA–DMF epoxy residue after the THF has flashed off, for the boiling point of the DMF solvent component is much higher than that of THF.

Step C.—The metal plate and the Teflon sheet, each coated with a thin layer of dried epoxy solution, are then transferred to a hydraulic molding press for bonding. In the press, as shown in FIG. 2, the metal plate 10, whose coated surface faces the coated surface of Teflon sheet 11 lying thereover, is placed on the heated stationary platen 12. The press includes a hydraulically-actuated, heated platen 13 adapted to press down on the stationary platen.

I have found that the metal plate 10 heats too rapidly when placed in direct contact with the heated platens of the press, and that as a consequence the bonding agent in the surface coatings becomes partially cured before the press is properly clamped. To avoid this drawback, which gives rise to deficient bonds, thermal inertia is introduced by means of paper or fiber boards 14 and 15 interposed between the heated platens 12 and 13, the parts being compressed therebetween, the boards providing thermal insulation which slows down the rate at which the metal plate is heated.

With this thermal-inertia arrangement, using a clamping pressure of thirty tons per square foot for a period of ten minutes, I have found that it is possible to produce Teflon-coated metal plates having excellent properties.

It will be evident from the foregoing that the entire procedure may be carried out at relatively high speed, for the application of coatings to the surfaces, the drying thereof, and the subsequent curing and bonding operations, can take place in a matter of minutes.

The resultant bonds are stronger than the Teflon material. In tests carried out with bonds made in accordance with the above procedure, failure always occurred through the etch-Teflon interface in the case of a thin Teflon sheet (.020″ thick). For a thicker Teflon sheet (.010″ thick), the Teflon tears and the sheet cannot be peeled from the metal plate. Using the above-described technique, I have bonded Teflon to steel, aluminum and brass, with equal ease and with uniformly good results.

Elastomer bonds

In some instance, it is desirable to bond a Teflon sheet to a substrate with an elastomeric bond to afford a more resilient surface when post-forming will be severe. The direct epoxy bond made in the manner previously described is relatively rigid, which is not objectionable in some situations but which, in other situations, may be disadvantageous. In an elastomer bond made according to my invention, the epoxy-anhydride resin does not function to directly adhere the Teflon to the metal plate or substrate, but as a carrier for chemical groups, permitting superior bonding with commercially available elastomers, such at Viton and Neoprene.

The sequence of steps involved in this elastomer bonding procedure is shown in FIG. 3.

Step A is the same as in the previous procedure and entails treating the Teflon and metal plate surfaces to be joined to improve their adhesion ability.

Step B.—The treated metal and Teflon surfaces are then thinly coated with an epoxy-dianhydride-elastomer mixed solvent solution having the following constituents:

| Material: | Grams |
|---|---|
| THF | 50 |
| PMDA | 5 |
| DMF | 20 |
| Epoxy | 10 |
| 10% solution of Neoprene or Viton in mixed solvent THF/DMF | 10–41 |

The thin coatings on both surfaces are then dried in the manner previously described.

Step C.—In this step, the dried epoxy-dianhydride-elastomer mixed solvent solution is tightly cured in a curing oven at 300° F. to 375° F. for a period of about fifteen minutes, serving to cross-link the PMDA-Epoxy. It is important to note that the elastomer residue in the dried three-component solution is not cured by the PMDA curing agent, for it does not react therewith and it remains in the cured epoxy coating as short chain tails that will later react with a properly catalyzed elastomer in Step D.

Step D.—In this step, the cured epoxy coatings on the Teflon and metal plate surfaces are sprayed or otherwise painted with a Neoprene or Viton elastomer solution having suitable catalytic agents therein of the type in common commercial use. The elastomer-covered surface is then dried at about 125° F. to drive off the solvents. Neoprene is a synthetic elastomer (poly chloroprene). "Viton" is the trademark for a series of fluoroelastomers.

Step E.—In this final step, the two surfaces are brought together under heat and pressure in a press, in a manner similar to that disclosed in connection with Step C in the previous bonding procedure, to effect curing and bonding of the elastomer to the epoxy-coated surfaces.

The elastomeric bonds obtained by the foregoing method are stronger than the materials used. Tests show that failures are usually through the elastomer layers on pieces with thick Teflon sheets (.020″ thick), or through the Teflon on others (.010″ thick or less).

The same technique has been used successfully to produce an elastomeric bond between two Teflon sheets. Once the epoxy primer layers are cured, the bonding process is independent of atmospheric conditions and does not require tight control for predictable results.

The elastomeric interlayer is not as immune to solvent attack as a direct epoxy bond, but its flexibility is exceptional. Hence the elastomer bonding procedure is appropriate to those applications in which a Teflon layer on a resilient backing is the primary desideratum, and where immunity of the interlayer to chemical attack is of lesser importance.

The curing of the surface film may be accelerated by incorporating a small amount of graphite or carbon in the film. Teflon is relatively permeable to infra-red rays, hence these rays, when used to accelerate curing, pass through the Teflon sheet and are absorbed by the carbon or graphite particles to generate heat which promotes the curing action. This accelerated curing is useful where long metal rolls having Teflon layers bonded thereto, are to be processed.

While there have been shown and described preferred techniques for bonding a Teflon layer to a substrate, in accordance with the invention, it will be appreciated that many changes and modifications may be made therein without, however, departing from the essential spirit of the invention.

I claim:

1. A technique for bonding a tetrafluoroethylene sheet to a substrate, comprising the steps of:
    (a) treating the surfaces of the sheet and substrate to be joined to improve their adhesion ability,
    (b) applying a thin coating to said treated surfaces of an epoxy resin solution containing a dianhydride curing agent and a mixed solvent constituted by tetrahydrofuran and dimethylformamide, which coating is then dried, and
    (c) bringing the coated surfaces of the sheet and substrate in engagement with each other and applying heat and pressure thereto to a degree and for a period effecting curing and bonding thereof.

2. A technique as set forth in claim 1, wherein said substrate is a metal plate.

3. A technique as set forth in claim 1, wherein the weight ratio of the tetrahydrofuran to the dimethylformamide in the mixed solvent is at least two to one.

4. A technique as set forth in claim 1, wherein said surfaces are subjected to heat and pressure through thermal insulation serving to introduce thermal inertia and to prevent partial curing prior to the application of full pressure.

5. A technique as set forth in claim 1, wherein said epoxy solution includes an elastomer which does not react with the curing agent, to create when cured a primer for an elastomeric coating further including the step of applying an elastomer solution to the primed surfaces whereby an elastomeric bond is produced when the elastomer solution is dried and cured.

6. A technique as set forth in claim 5, wherein said elastomer is neoprene.

7. A technique as set forth in claim 5, wherein said elastomer is a fluoroelastomer.

8. A technique for forming an elastomeric bond between a Teflon sheet and a metal plate, comprising the steps of:
    (a) treating the surfaces of the sheet and metal plate to be joined to improve their adhesion ability,
    (b) applying a thin coating to the treated surfaces of an epoxy resin solution containing a dianhydride curing agent and an elastomer non-reactive with the agent, said solution further containing a mixed solvent constituted by tetrahydrofuran and dimethyl formamide,
    (c) drying and curing the coatings on said surfaces to create a primer thereon,
    (d) applying to the primer on said surfaces an elastomer solution of the same elastomer material included in said epoxy solution; and
    (e) drying and curing said elastomer solution under heat and pressure with the surfaces in engagement with each other and to a degree and for a period effecting an elastomeric bond between the sheet and substrate.

9. A technique as set forth in claim 8, wherein said elastomer is neoprene.

References Cited
UNITED STATES PATENTS

| | | | |
|---|---|---|---|
| 2,324,483 | 7/1943 | Castan | 260—47 |
| 3,004,931 | 10/1961 | Brueschweiler et al. | 117—161 X |
| 3,023,189 | 2/1962 | Jupa | 260—45.5 |
| 3,067,078 | 12/1962 | Gluck | 156—330 X |
| 3,262,916 | 7/1966 | Gaertner | 260—78.4 |
| 3,418,201 | 12/1968 | Bowman | 161—184 |
| 3,687,705 | 8/1972 | Kilbane | 117—17 |

ALFRED L. LEAVITT, Primary Examiner

R. A. DAWSON, Assistant Examiner

U.S. Cl. X.R.

11—47 A, 49, 75; 156—334; 161—186, 189, 218, 411